UNITED STATES PATENT OFFICE.

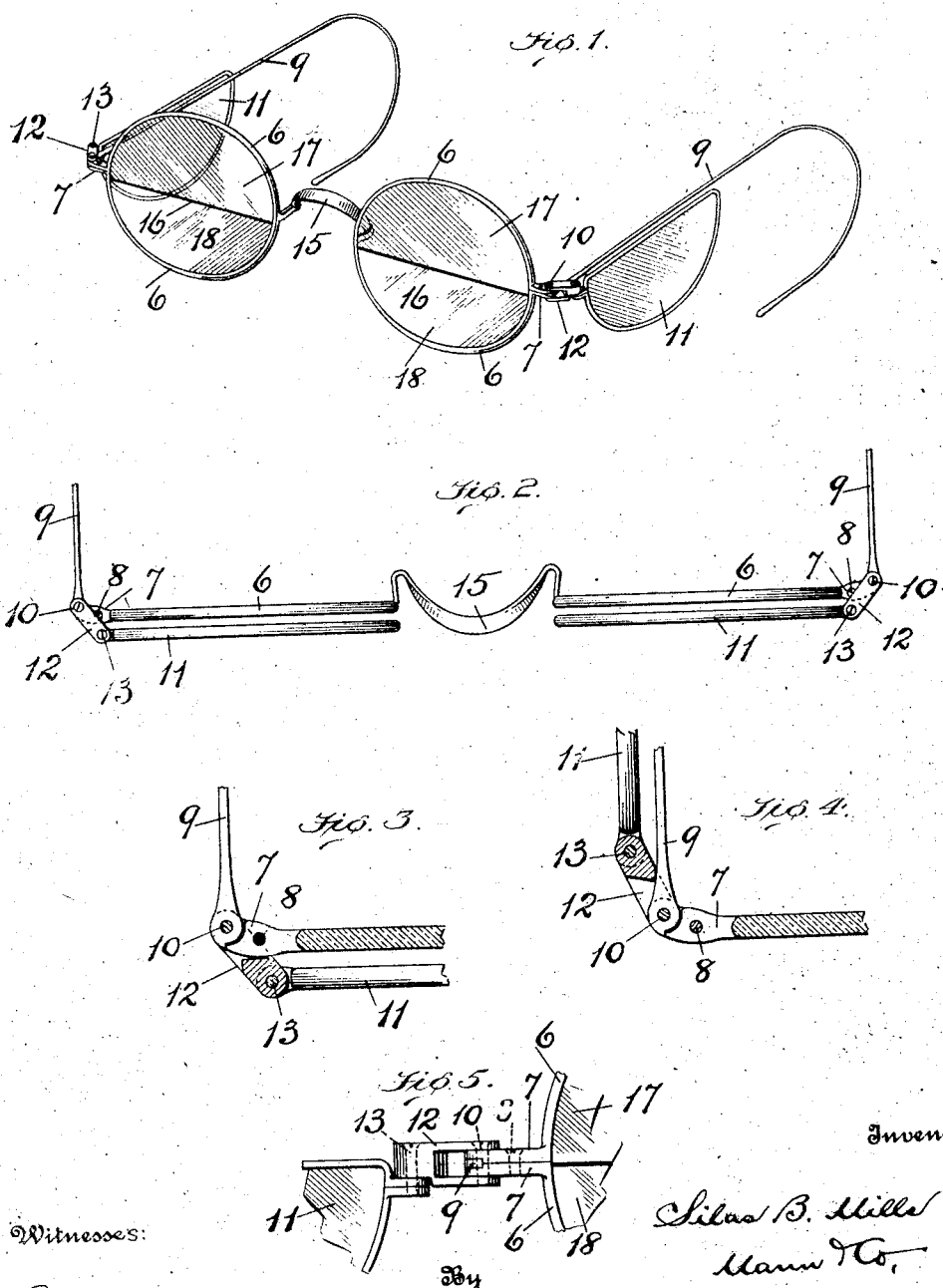

SILAS B. MILLS, OF BALTIMORE, MARYLAND.

SPECTACLES OR OTHER VISION-GLASSES.

1,206,457.  Specification of Letters Patent.  Patented Nov. 28, 1916.

Application filed June 3, 1916.  Serial No. 101,450.

*To all whom it may concern:*

Be it known that I, SILAS B. MILLS, a citizen of the United States, residing at Baltimore, in the State of Maryland, have invented certain new and useful Improvements in Spectacles or other Vision-Glasses, of which the following is a specification.

This invention relates to spectacles or other similar vision glasses.

I have found from experience and observation that there are many persons such as draftsmen, mechanics, and others engaged on the work of large structures, who require eye-glasses or spectacles that will provide two near ranges of vision, and often require three ranges, such as a near or reading, a distance, and an intermediate range. As an example, a draftsman working from a model or machine located four, five or six feet from his drawing board, may need a lens for the nearest or reading distance which lens however is not suitable for viewing the model at a distance of say six feet, and his distance lens is just as unsuitable because its focus is for a much greater distance than six feet. To meet these conditions I provide an improved eye-glass or spectacles wherein two different near fields of vision and also a distance field of vision are all available.

One object of the invention therefore is to provide an improved structure in spectacles or eye-glasses, that shall combine a pair of bifocal vision lenses, a suitable nose-bridge retaining the two lenses of said pair in a fixed relation to said bridge, and two movable lenses each having a like focus but which may be either plus or minus relative to the near focus of the said bifocal lenses, and each movable lens sustained at the outer edge of one of said bifocal lenses and adapted to be moved in front of the same so as to cover only the near focus part thereof, whereby a person's eyes may have a view through either the nearest focus or through the most distant focus of the uncovered part, or through the intermediate focus produced by the movable lens covering the reading part of the bifocal.

One form of embodiment of this invention is illustrated in the accompanying drawing, in which,—

Figure 1, is a perspective view showing one form of the improved spectacles. Fig. 2, is a top plan view on a larger scale than is used in Fig. 1, and showing the two movable lenses shifted from their outside position seen in Fig. 1, to a position in front of the fixed lenses. Fig. 3, is a view on a larger scale than used in Fig. 2, and shows a movable lens positioned in front of a fixed lens as at the left side of Fig. 2, the fixed lens being in section. Fig. 4, is a view of the same parts seen in Fig. 3, but showing the movable lens positioned parallel with the temple-bars, the fixed lens being in section. Fig. 5, is a side view of one of the swinging links which in this case connects one end of the frame containing a fixed lens, with one of the movable lenses, and which link is also connected with the pintle of a temple-bar, the lenses in this figure being broken to lessen the space required on the drawing paper.

Referring now to the drawings and to the reference numerals marked thereon, the numeral 6, designates two bows or rims which are connected by the familiar nose-bridge 15. Each bow or rim 6, has a lens that always remains in fixed relation to the nose-bridge.

The outermost end of each rim or bow 6, is split as usual and the two split parts 7, are secured together by a screw 8; in the case of spectacles the end of each temple-bar 9, has the usual position between said two split parts 7, at a point beyond said screw 8, and another screw 10, connects the temple-bar with the two split parts and serves as a pivot for the temple-bar.

The construction just described is old.

I employ at each end of the spectacle frame, designated 6, 15 and 7, a movable lens 11, the movement being permitted by a suitable hinge; these hinged lenses when turned back are positioned on the outer side of the temple-bars 9, but when in use are positioned in front so as to cover the lower half of the fixed lenses. I also provide, in the present instance, two swinging links 12,—one at the outer end of each fixed lens, and each link has one of its ends jointed to said movable lens 11 by a screw 13, and its other end is jointed on the screw 10, which also serves as a pivot for connecting the temple-bar 9, with the split part 7, that is at the outermost end of each bow or rim 6, that contains a fixed lens. These swinging links are desirable because they afford freedom of movement to the movable lenses 11, when taking their two positions; but other forms of joints may be employed.

The vision lenses which are fixed at opposite sides of the nose-bridge 15, are of the type known as bifocal and may be oval-shaped or other shape. That the fixed lenses are bifocals, is indicated in Fig. 1, by the central lines 16, extending horizontally across the lenses; the upper lens 17, is the distance and the lower lens 18, the reading. Any other known form of bifocal may be used.

The focus of each movable lens 11, may be either a plus or a minus relative to the fixed lenses, and said movable lens consists of a glass whose lower edge has the same shape as the lens that has fixed relation to the nose-bridge, its top edge however is straight and thereby the movable lens when swung in front of said fixed lenses will cover only the lower or reading part of the bifocal lens and by this combination of lenses 11 and 18, produce a third focus that is intermediate in distance of the upper lens 17, and the lower lens 18. It will thus be understood the fixed lenses are bifocals and the movable lenses 11, have a size and shape to cover only one field of vision of the fixed bifocals, thereby the wearer of the improved glasses will have three fields of vision, namely a near field of vision, a distance field of vision, and an intermediate field of vision available for his use. It will also be understood this improvement may be embodied so that the lenses shall be set in rims, or where all the vision glasses are rimless, as I have heretofore embodied this improvement both ways. I have also successfully embodied the improvement with jointed parts without including the swinging links.

The inventive idea herein disclosed is to provide vision glasses that will combine and embody a pair of bifocal lenses, and a pair of hinged lenses which have a different focus from either foci of the said bifocals, and said hinged lenses so arranged and constructed that when moved to the viewing position they will overlap and coact with only a part of the bifocals, to wit, either part that produces one focus of the two foci of said bifocals, and thereby produce a third focus available for the eyes of a person using such vision glasses.

Having described my invention what I claim is,—

1. In an eyeglass the combination with a nose bridge-piece, of a pair of lenses fixed with respect to said nose bridge-piece, said fixed lenses each having two fields of vision, and lenses sustained at one side of each fixed lens and ground to modify the focus of one field of vision of the fixed lenses,—said modifying lenses being movable so as to cover only one field of vision of said fixed lenses, whereby the said eyeglasses provide for the wearer a near field of vision, a distance field of vision, and an intermediate field of vision.

2. In an eyeglass the combination with a bridge-piece, of a pair of fixed lenses rigidly attached to said bridge-piece and ground to provide two fields of vision; temple-bars pivotally mounted at the outer ends of the fixed lenses, and lenses pivotally sustained from each temple-bar mounting and movable from a position substantially parallel with and where they cover one field only of the fixed lenses to a position substantially parallel with the temple-bars whereby to provide a near field of vision, a distance field of vision and an intermediate field of vision for the wearer.

3. In vision glasses of the kind described, the combination with a nose bridge-piece, of a pair of bifocal lenses in fixed relation to the said nose bridge-piece; a lens hinged adjacent the outer edge of each bifocal lens and having a different focus from either foci of the said bifocal lenses, said hinged lenses when swung into position adapted to coact with and modify one focus only of said bifocals, thereby producing a third and intermediate focus for the eyes of the wearer.

In testimony whereof I affix my signature in the presence of two witnesses.

SILAS B. MILLS.

Witnesses:
CHAS. B. MANN,
BERTHA K. WALTER.